Inventor
William F. Oberhuber
Ernest Wollin
By ............ Attorneys.

Nov. 15, 1960   W. F. OBERHUBER ET AL   2,960,047
BURNER FOR FINELY DIVIDED FUEL

Filed Dec. 6, 1955   8 Sheets-Sheet 7

INVENTOR
William F. Oberhuber
Ernest Wollin
BY
ATTORNEYS

United States Patent Office  2,960,047
Patented Nov. 15, 1960

2,960,047

BURNER FOR FINELY DIVIDED FUEL

William F. Oberhuber, 4103 Chestnut St., Philadelphia 4, Pa., and Ernest Wollin, 4801 Locust St., Philadelphia 39, Pa.

Filed Dec. 6, 1955, Ser. No. 551,315

11 Claims. (Cl. 110—28)

The present invention relates to burners for fluid fuel such as pulverized or crushed coal, oil or gas.

A purpose of the invention is to provide a wider range of adjustment of the angular movement of burners for fluid fuel and permit the burner to sweep through 360°.

A further purpose is to obtain increased refractory life and cut down on slag formation in a furnace such as a furnace for heating a boiler.

A further purpose is to manipulate burners over an orbital path which is variable as to the major and minor axis.

A further purpose is to permit adjustment of burners universally throughout a wider cone angle and permissibly in unison.

A further purpose is to provide remote control means for universal adjustment of burner positions.

A further purpose is to interpose universal joints between a fuel tube and fuel nozzle, and a surrounding air housing and air nozzle, and to adjust the angular positions of the fuel and air nozzles in unison by intersupporting the nozzles and manipulating them by a cam or a crank.

A further purpose is to make the cam or crank means adjustable.

A further purpose is to manipulate a universally pivoted gimbal plate by cam means and to interpose push rods pivoted at one end to the gimbal plate and at the other end to the nozzles.

A further purpose is to guide the push rods at intermediate points between their ends.

A further purpose is to provide spring biased yielding of the push rods in their sockets at one end.

A further purpose is to make the relative lengths of the push rods adjustable.

A further purpose is to resiliently bias the nozzle means against the connecting means at the universal joint so that the parts will remain in contact notwithstanding variations in contour of the joint surfaces.

A further purpose is to throw the nozzle means by a crank, the cranks acting through a push rod or push rods, suitably controlled by gimbal plates, and to adjust the crank stroke and the connecting rod length.

A further purpose is to adjust the crank stroke by means of sungears and planetary gears, the sungears being selectively released and stopped.

A further purpose is to change the relative angular relations between two cranks acting in planes normally at right angles to one another and transverse to the longitudinal axis of the burner.

A further purpose is to employ a universal guide on one of the push rods between the crank and the nozzle means.

A further purpose is to provide a wider range of adjustment of the angular positions of burners for finely divided or crushed fuel as now known or heavier for burning fuel in suspension.

A further purpose is to provide means to rotate the burner in such a way as to regulate superheat by remote control by shifting the angularity of the rotary burners to suit the firing conditions.

A further purpose is to reduce the number of burners required because of the improved distribution of the fuel throughout the furnace.

A further purpose is to reduce the slag condition by being able to swing the burners to affect the slagged areas of the tubes thereby improving the heat input to the evaporating surfaces.

A further purpose is to improve combustion conditions to prevent smoke.

A further purpose is to reduce carbon content in the fly ash.

A further purpose is to insure more stable conditions at light loads by virtue of the ability to set the angle of the burners so as to support ignition from adjacent burner flames.

A further purpose is to regulate the floor temperature on the slag top furnaces to control the rate of the slag flow from the furnace.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figures 8 to 10 illustrate a preferred embodiment of the invention.

Describing in illustration but not in limitation and referring to the drawings:

In many large boiler installations, groups of burners are used in burning fluid fuel such as pulverized or crushed coal, oil and gas. It is desirable to change the angular adjustment of these burners from time to time, and preferably to interrelate the positions of different burners so that the desired relationship between adjoining flames will be obtained in various angular positions to obtain higher efficiency. Oberhuber United States Patent No. 2,343,572, granted March 7, 1944, for Finely Divided Fuel Burner, illustrates an arrangement for adjusting the position of an individual burner in a horizontal plane or in a vertical plane, the adjustment being made locally at the particular burner.

It is desirable to have a more simple, rapid and reliable adjustment, which will permit the setting of any particular burner or all burners universally into any angular position within a wide cone angle and in addition to predetermine a conical path of cyclic motion for the flame distribution, and will permit remote control of the adjustment and changing of adjustments of a group of burners in unison while maintaining a predetermined interrelation.

The present invention is designed to permit the setting of a particular burner at any angle within a predetermined solid cone angle, the shifting of the setting of the particular angle automatically or manually, and locally or by remote control, and the programmed sweeping of the burner through a conical path intermittently or continuously.

Thus in accordance with the invention, all of the burners on a particular furnace can be angularly shifted together or all of the burners of a particular group can be angularly shifted, making the burners swing up or down or to the right or to the left, over a predetermined orbit having a center of symmetry, but which orbit is not necessarily symmetrical to the burner axis. Due allowance can be made for peculiarities of the position of a particular burner, such as an end burner, and it can follow a path which is different than that of other burners if desired.

The fuel nozzle is connected to the fuel tube by a universal joint, and the air nozzle is connected to the air tube by a universal joint and surrounds the fuel nozzle. The two nozzles are supported generally coaxially together and the nozzle positions are determined by cam means. A gimbal plate is angularly shifted by the cam, the gimbal plate preferably being mounted universally. The motion of the gimbal plate is interconnected with the nozzles, preferably by push rods which are pivoted at the ends, and desirably are suitably guided and individually adjusted as to length.

Allowance for slight differences of required length of the push rod is desirably made by spring biasing them at one end into their sockets.

In the preferred embodiment of the invention, the nozzle is counterweighted to maintain a relation of minimum friction with respect to the connecting means, so as to reduce the effective weight of the nozzle from the standpoint of manipulation and to assure that the nozzle will remain in close but low friction relative to the mating parts of the universal joint.

In one very desirable form of the invention, two cranks operating in planes at right angles to one another and at right angles to the longitudinal axis of the burner manipulate the nozzle means through connecting rods and push rods, the cranks being adjusted as to length of the crank arm and the effective lengths of the connecting rods similarly being adjusted.

The push rods or the like are conveniently also guided by gimbal plates pivoted respectively at right angles to one another.

The adjustments of the crank arm length can very conveniently be accomplished by using selective retardation of sun gears operating in combination with planetary gears. A universal joint mounting can also be used for the push rod or push rods.

Considering now the drawings in detail, the burner is mounted on bracket 20 having a supporting plate 21 which is suitably attached to the furnace.

A fuel tube 22 passes through an opening in the bracket and is secured therein. The fuel tube is threaded at 23 at its end remote from the nozzles, and is there interconnected with suitable piping through which fuel such as pulverized coal in a suitable medium passes to the burner.

At its forward end the fuel tube 22 suitably has a ball head 24, which mates in a socket 25 at the rear end of a fuel nozzle 26 by which the fuel is projected into the furnace. No matter how the burner is manipulated, the universal joint always remains tight, as will be subsequently explained.

The fuel tube 22 near its forward end is surrounded by an air housing 27 having an air inlet connection 28 which communicates with a suitable pipe supplying secondary air for combustion. The housing is desirably secured to the fuel tube. At its forward end the housing supports a socket 30 which engages with a ball 31 of air nozzle 32 surrounding the fuel nozzle and spaced from it to provide an annular air port 33 entering the furnace.

The fuel and air nozzles are intersupported by spider structure 34 extending from the fuel nozzle to the air nozzle. The ball and socket joints are concentric.

The air nozzle has around the outside a flange 35 which extends radially outward and has a rearwardly sloping portion 36, then a radially extending portion 37, then a rearwardly extending portion 38 and an outer rim 40 which is preferably in sealing relation with the inside of a socket 41 formed of refractory or otherwise in the furnace wall.

At the rearward end of the fuel tube, the fuel tube journals gear 42 having hub 43 surrounding and freely turning on the fuel tube. The gear may be used as a hand wheel to adjust the position of the burner locally, or it may be intergeared with a remote control system, such as one of the output gears on a self-synchronous transmitter and receiver, so that all of a group of burners will be manipulated in unison. The gear can be locked in any desired position where local setting is used. A thrust collar 44 is shown at 44.

Figure 1:
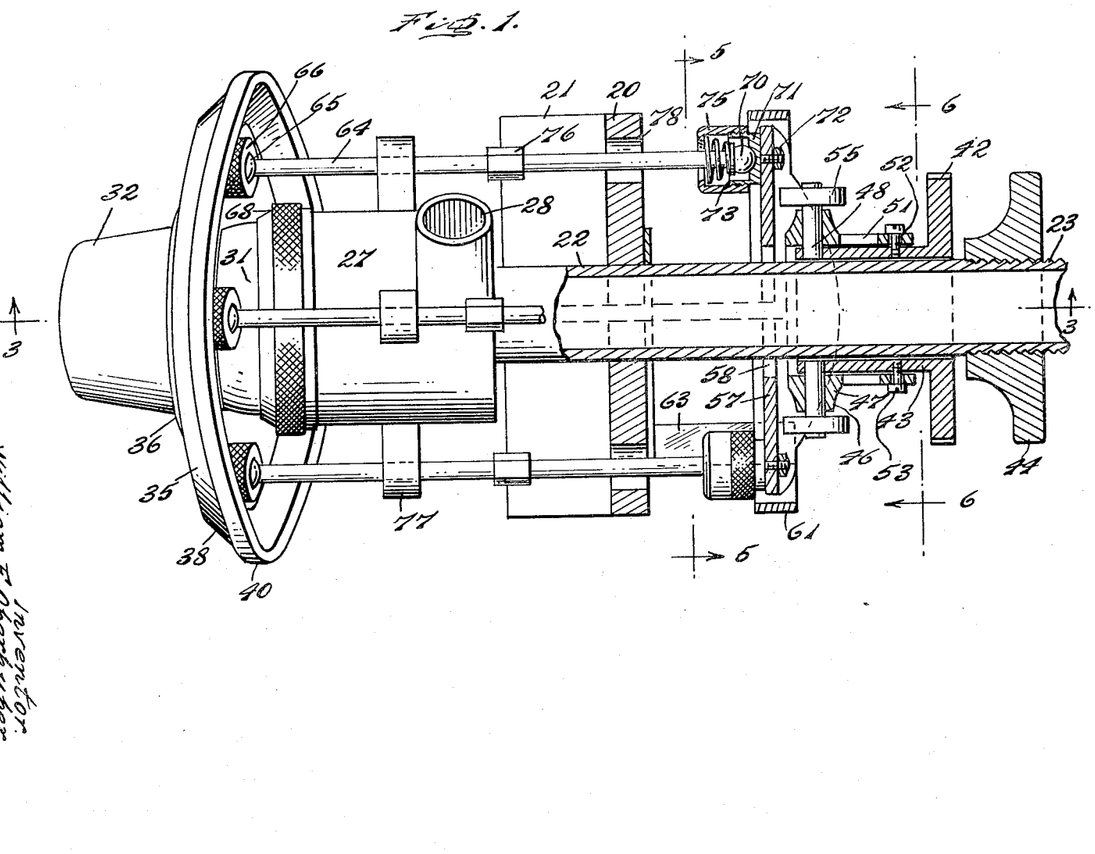
Figure 1 is a top plan view of one form of the finely divided fuel burner of the invention, partly in axial section.
Figure 2:
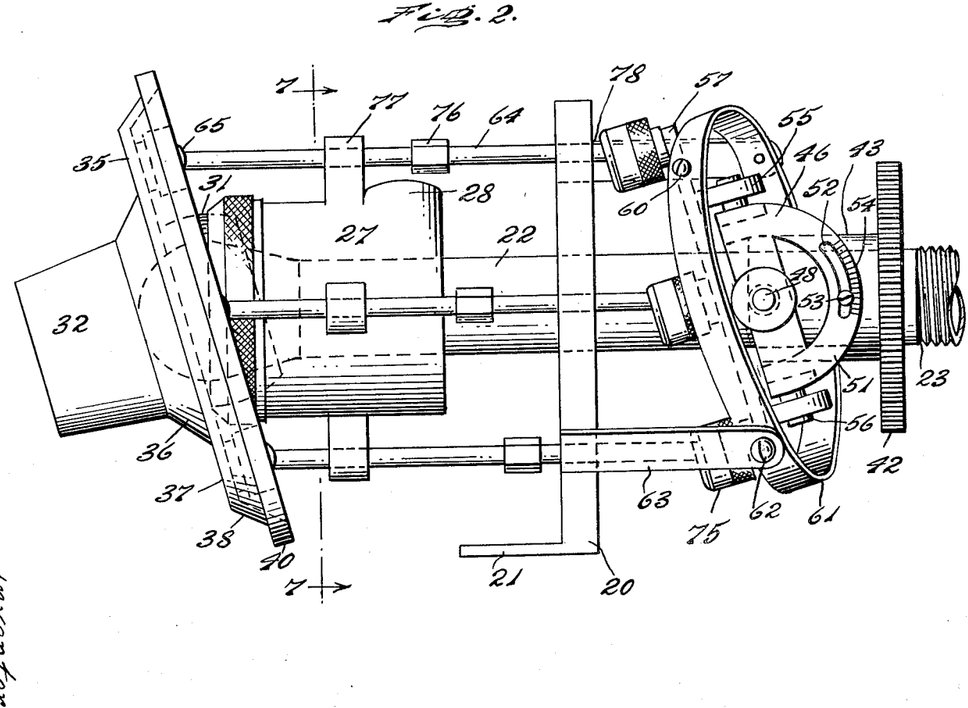
Figure 2 is a side elevation of the device of Figure 1.
Figure 6:
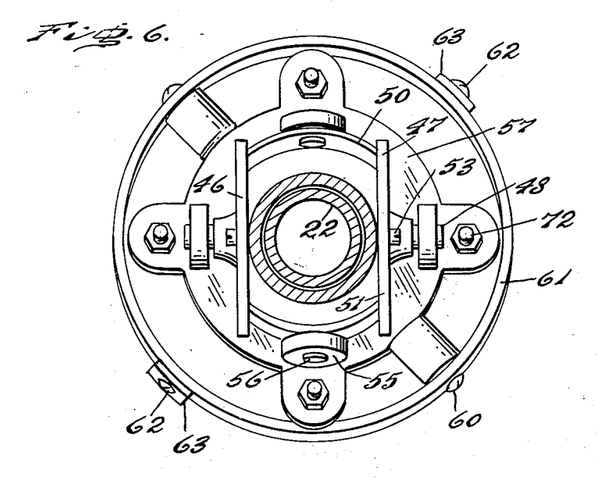
Figure 6 is a section on the line 6—6 of Figure 1.
Figure 7:
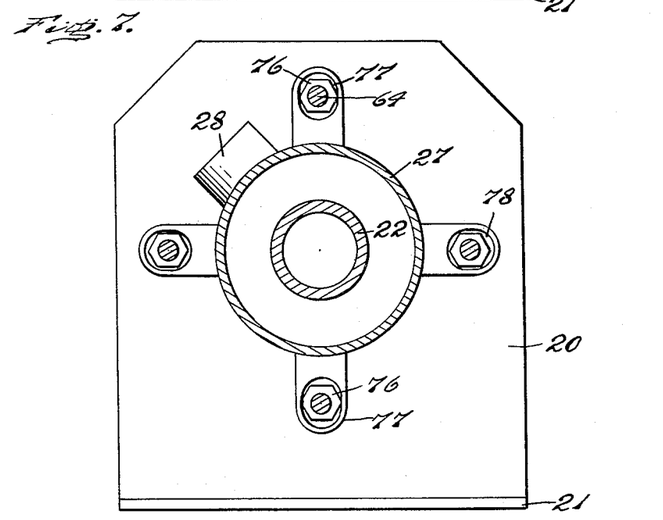
Figure 7 is a section on the line 7—7 of Figure 2.

On the gear hub, cam means 45 is mounted, consisting of a ring 46 extending clear around the burner tube and hub and free with respect thereto. As best seen in Figure 6, the ring 46 comprises side segments 47 which are pivoted to the hub 43 by pins 48 (Figure 1) and end straps 50 connecting across between the side segments, united thereto as by welding, and widely spaced from the burner tube so as to permit angular tilting. The side segments have arc portions 51 extending rearwardly, carrying arcuate adjustment slots 52 which receive adjustment screws 53 to mount the structure in any desired adjustment position. In order to read the adjustment angle readily, a scale 54 is applied to the segments.

The effective cam in the present case comprises rollers 55 at quadrant positions around the axis of the fuel tube, two of the opposed rollers being pivoted on the pins 48, and two rollers at intermediate positions being pivoted on pins 56 secured to the straps 50. The rollers are advantageous to reduce the cam friction, but making it possible by angularly shifting the quadrants to dispose the cam in any angular plane.

The rollers 55 engage the rearward face of a gimbal plate 57 which has an internal opening 58 passing the fuel tube with adequate clearance to permit angular shifting. The gimbal plate 57 is universally mounted, preferably by a gimbal ring, pivots 60 at one quadrant position pivotally connecting the gimbal plate 57 to ring 61 surrounding the gimbal plate and having adequate clearance from it, and pivots 62 at intermediate quadrant positions pivotally connect the ring 61 to diametrally opposite pivot brackets 63 extending rearwardly from the bracket 20.

Figure 3:
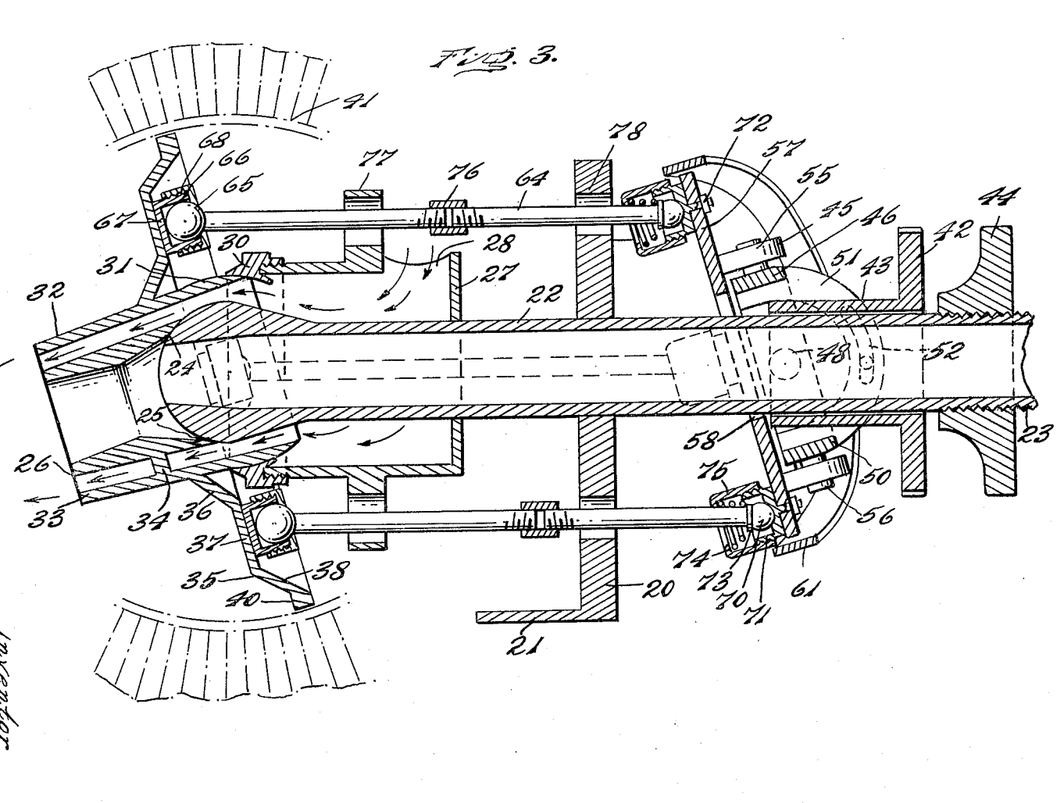
Figure 3 is a longitudinal section on the line 3—3 of Figure 1.
Figure 4:
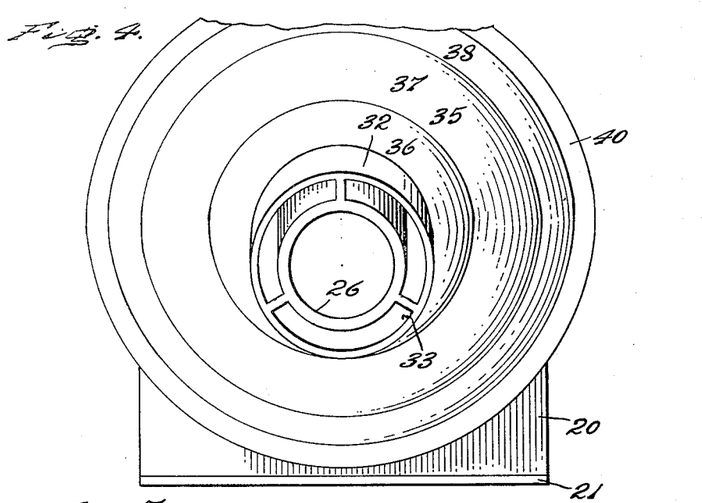
Figure 4 is a front end elevation of the device of Figures 1 to 3.
Figure 5:
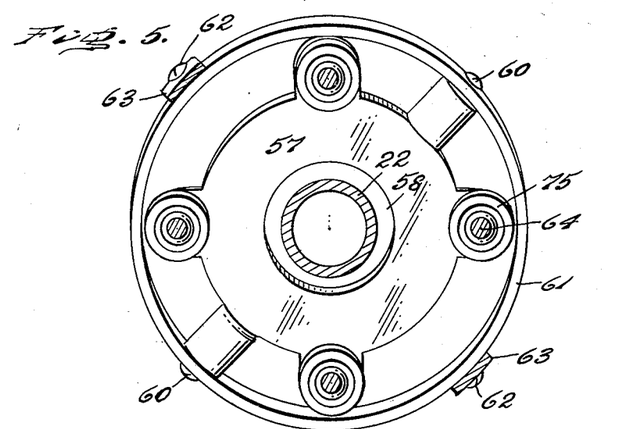
Figure 5 is a section on the line 5—5 of Figure 1.

It is very desirable to have the cam means and the gimbal plate accessible outside the furnace, and not subjected to the heat of the burner. This is accomplished by connecting the gimbal plate 57 with the nozzles by push rods 64 having universal pivotal connection with the gimbal plate at one end and with the nozzles at the other end. The push rods are desirably disposed at quadrant positions around the fuel tube. At the forward end the push rods have ball heads 65 which engage in universal socket mounts 66 secured on the rearward face of the radial portion 37 of the flange 35 extending outward from the nozzles. Each socket as shown in Figure 3 preferably comprises a cup 67 secured to the flange and a holder 68 threaded to the cup and having an opening to pass the push rod.

At the ends adjoining the gimbal plate the push rods have ball heads 70 which are received in socket cups 71 secured as by screws 72 to the gimbal plate. The push rods desirably have spring abutments 73 forward of the heads and engaging suitable conical spiral compression springs 74, the opposite ends being held in retainers 75 which surround the push rods and have sufficient freedom in their openings to allow full angular movement of the push rods. The retainers thread into engagement with the socket cups. Thus if the adjustment of push rod length is not precise or change in length is required in angular movement, freedom for slight displacement of the balls from the sockets against the bias of the springs is permitted.

The push rods and sockets together with the springs 74 also serve to maintain the fuel and air nozzle universal joints in resilient tight engagement.

The push rods are made in two parts, joined by adjustment nuts 76 intermediate their ends, and suitably threaded to the push rods by right and left hand threads.

The push rods are preferably mounted at quadrant positions, and while they move longitudinally they do not move appreciably angularly. Guide lugs 77 extend out from the air housing 27 and surround the push rods with considerable clearance and guide openings 78 extend through the bracket 20 at the push rod locations, again providing adequate clearance.

In operation of the device, an initial determination is made as to whether the particular burner is to be set for cyclic conical orbital movement along a cone symmetrical with the axis or not symmetrical, and appropriate adjustment is made in the relative lengths of the respective push rods to meet this requirement. The segment adjusting screws 53 are then loosened and the segments are adjusted to determine the cone angle through which the nozzles are to move. The adjustment screws are then tightened and the device is set for this cone angle. The relative position of this particular burner with other burners is determined by angularly shifting the gear 42 in its intermeshing relation to the output gearing of the remote control system so that a proper phase relationship in its orbital movement is obtained for each burner in relation to the others. If the adjustment is manual at the individual burner this feature is not necessary.

When the burner is to be readjusted, the gear 42 is angularly shifted to the desired position, which shifts the angular setting of the angularly disposed plane established by the cam rollers 55 and therefore determines the angular position of the gimbal plate, and through the push rods establishes the angular position of the burner.

Figures 8, 9, 10:
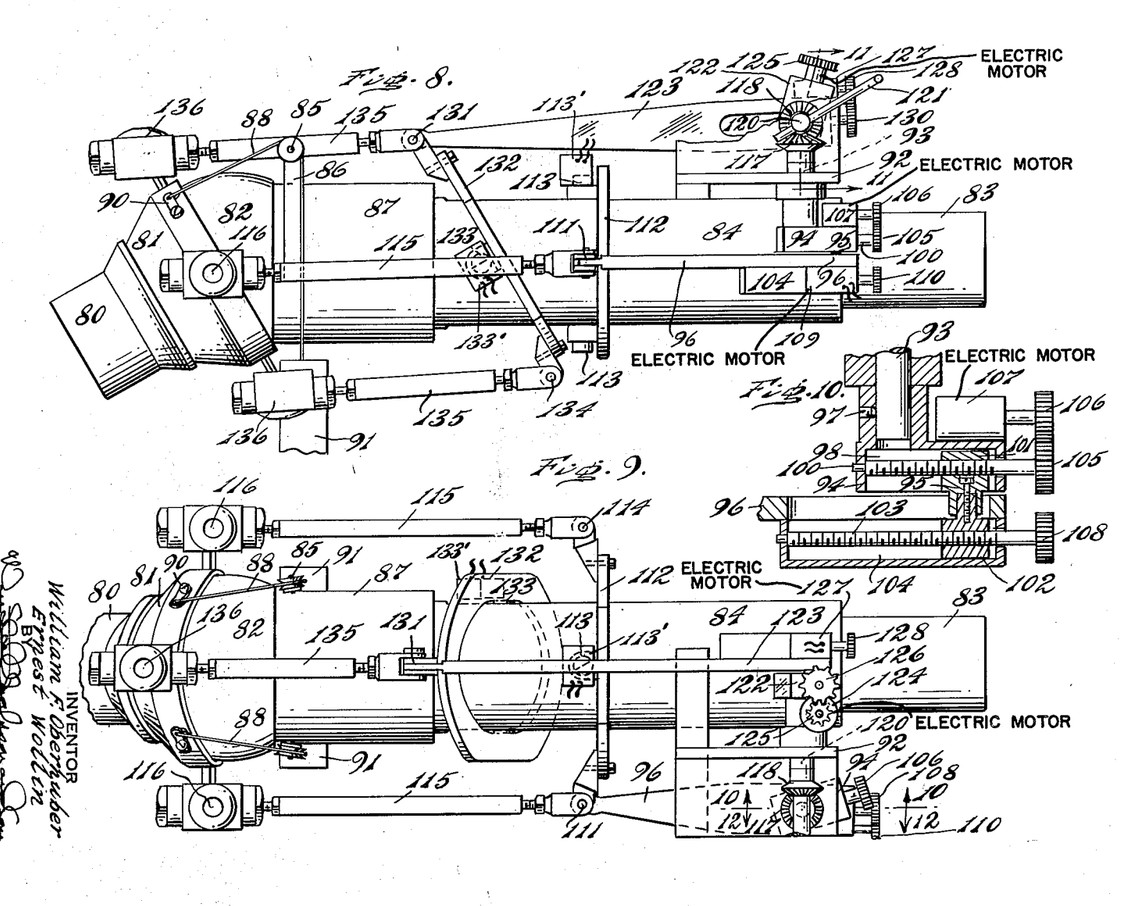
Figure 8 is a fragmentary diagrammatic side elevation of a preferred modification.
Figure 9 is a fragmentary diagrammatic top plan view of the device of Figure 8.
Figure 10 is an enlarged fragmentary vertical section on the line 10—10 of Figure 9.

Considering now the form of Figures 8 to 10, the nozzle means 80 has inner and outer nozzles as previously described forming parts of a double female universal joint 81, which cooperate with the parts of a double male universal joint 82 as previously described which connect with an inner fuel tube 83 communicating with the inner fuel nozzle and an outer air tube 84, the space between the fuel and air tubes communicating with the outer air nozzle.

The tubes are respectively held in spaced relations by spiders not shown.

The nozzles in the larger installations are very heavy, and we illustrate pulleys 85 located rearwardly and above the male universal joint elements 82 and supported on brackets 86 from a housing 87 secured to the outer tube 84. Cables 88 at either side of the burner are carried from cable anchorages 90 on either side near the top of the nozzle over the pulleys 85 and then down to support counterweights 91. Thus the effective weight of the nozzle means which must be moved is counterbalanced and the nozzle is maintained suspended adjacent to, but in spaced relation to the male part of the universal joint, avoiding frictional engagement at this point, avoiding the possibility of binding due to thermal expansion and eliminating abrasion. The spaced relation between the parts of the universal joint is adjusted by appropriate lengthening and shortening of the effective lengths of the push rods 115 and 135.

At the rear of the burner an angular bracket 92 extends out to one side and journals a vertical crank shaft 93 mounting a crank 94 whose crank pin 95 interconnects with a connecting rod 96 of adjustable length as will be explained.

The crank 94 comprises a housing which is secured on to the crank shaft 93 by set screw 97. Extending radially and journalled in the crank shaft in a housing space 98 is a screw 100 which threads through a nut 101 mounting the crank pin 95 and pivotally connecting with a nut 102 on the connecting rod 96, which receives a screw 103 journalled longitudinally of the connecting rod in a housing 104 as best seen in Figure 10.

The screw 100 has a gear 105 at one end which meshes with gear 106 on adjustment motor 107 mounted on the crank, which will suitably be a self synchronous motor of a remote control system. Electrical connections to the motor 107 are suitably made through slip rings, not shown. The screw 103 has a gear 108 at one end which meshes with gear 110 driven by another self synchronous motor 109, to adjust the effective length of the connecting rod. The motor 109 is mounted on the connecting rod.

The connecting rod 96 pivotally connects at 111 with one side of a gimbal plate 112 which surrounds the tube 84, the gimbal plate 112 being pivoted at 113 on the tube 84 on an axis parallel to the axis of the crank shaft 93.

The gimbal plate 112 at opposite ends pivotally connects at 111 and 114 with push rods 115 which at the opposite ends connect by universal joints 116 with the nozzle means, the universal joints 116 and the pivotal positions 111 and 114 being 90° removed from the pivots 113 of the gimbal plate 112.

The crank shaft 93 at its upper end has bevel gear 117 which meshes with bevel gear 118 on a cross shaft 120 which is disposed at an angle of 90° with the shaft 93 and mounts a crank handle 121 at one end. The cross shaft 120 mounts at the opposite end a crank 122 which pivotally connects with a connecting rod 123. The structure of the crank and connecting rod from an adjustment standpoint is the same as the structure of Figure 10, the crank pin being mounted on a nut, and the cooperating nut on the connecting rod being adjustable longitudinally. A self synchronous motor 124 on the crank 122 carries a gear 125 which meshes with a gear 126 on the crank adjustment screw to adjust the crank. Electrical connections are made to motor 124 by slip rings not shown. A self synchronous motor 127 (mounted on the connecting rod 123) of a suitable remote control system carries a gear 128 which meshes with a gear 130 on the screw which adjusts the length of the connecting rod.

The connecting rod 123 at its end remote from the crank pivotally connects at 131 with a gimbal plate 132 which surrounds the tube 84 and is pivotally connected to the tube at 133 parallel to the axis of the cross shaft 120.

Self synchronous indicators 113' and 133' indicate the angular positions of the gimbal plates at any suitable remote point. Suitable limit switches to prevent jamming the structure will desirably be incorporated in the self-synchronous indicators as well known.

The gimbal plate 132 at opposite ends 131 and 134 pivotally connects by push rods 135 with universal joints 136 respectively at the top and bottom of the nozzle means. It will be evident that the push rods 115 and 135 are adjustable as to length by employing clevis ends with screw extensions and central nut portions as well known in the art.

In operation of the device of Figures 8 to 10, the relative strokes of the cranks are adjusted by the remote control means and the effective lengths of the connecting rods are adjusted by the remote control means to assume any desired simultaneous combinations.

It is evident that adjustment of the lengths of push rods 115 and 135 permits the universal joints between the nozzle means and the fuel and air tubes to be maintained in accurately spaced close engagement to provide a seal having a minimum of friction. It should be recalled that the weight of the nozzle means is counterbalanced by the counterweight 91.

The turning of the cross shaft 120 either under the action of the crank handle or by a motor drive on the shaft manipulates the cranks according to their instantaneous setting and according to the instantaneous setting of the connecting rods 96 and 123 and moves the gimbal plates angularly in unison to describe a suitable orbit of the nozzle. At all times regardless of the particular position of the nozzle, the counterweights reduce the pull on the operating mechanism. It is also within the scope of our invention, however, to use springs connected between the cable anchorages 90 and the bracket 86 in place of the counterweights illustrated to support the weight of the nozzle means.

Figure 11:
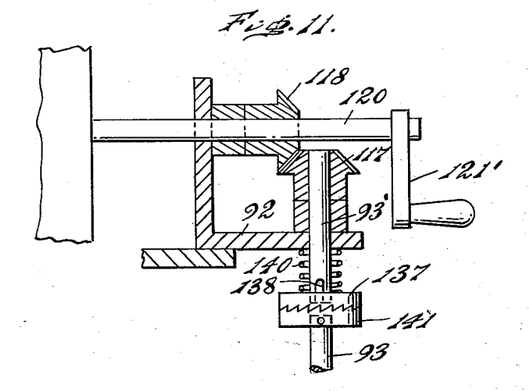
Figure 11 is a fragmentary view of a modification shown in section in a position which corresponds to the line 11—11 of Figure 8, illustrating a mechanism for adjusting the relative angular positions of the cranks.

It is sometimes desirable to change the relationship of the angular positions of the cranks to achieve a particular orbital setting or a particular angular position of the nozzle. This can be done according to Figure 11 by turning the cross shaft 120 having a handle 121' backwards so that clutch face 137 yields in slot 138 against the action of helical compression spring 140 surrounding crank shaft 93'. A fractional turn backwards will produce the desired angular change between the cranks and then forward motion can proceed, in which case the clutch half 141 is engaged to drive the crank shaft 93 in the usual manner.

Figure 12:
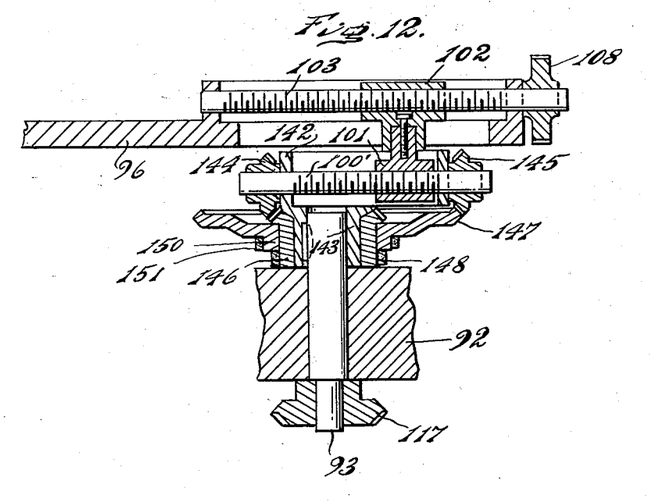
Figure 12 is an enlarged fragmentary view of a further modification of the mechanism for adjusting the relative angular positions of the cranks, shown in section in a position which corresponds to the line 12—12 of Figure 9.

In some cases it may be preferable to use a different method of adjustment of the crank, and in Figure 12 this is accomplished by planetary gearing. In this form the crank shaft 93 mounts the crank arm 142 having a hub extension 143 surrounding the crank shaft and keyed thereon. As in Figure 10, a crank adjustment screw 100' extends across and is journalled in the crank arm and mounts the crank nut 101 which pivotally interconnects with the nut 102 on the screw 103 extending longitudinally of the connecting rod 96.

At opposite ends the screw 100' has planetary bevel gears 144 and 145 respectively on small and large radii from the crank axis. The crank arm hub 143 freely carries a bevel gear 146 concentric with the crank axis and meshing with the planetary gear 144. The collar portion of the bevel gear 146 is surrounded and freely engaged by a larger bevel gear 147 concentric with the crank axis and meshing with the planetary bevel gear 145. The collar portion of the gear 146 is surrounded by a brake band 148 of well known character, spring urged toward releasing and solenoid gripped against the action of the spring as well known in brake bands. A collar portion 150 of bevel gear 147 is similarly surrounded by a brake band 151 spring urged toward releasing and gripped by solenoid action against the spring, as well known in the art.

In operation of the form of Figure 12 with both brake bands released by spring actuation, there is no action of the gears onthe screw 100'. Both sun gears are turned by their respective bevel gears in unison with the crank.

If the brake band 148 grips, by the action of the solenoid, the crank arm 142 and hub extension 143 continue turning but sun gear 146 becomes stationary. The continued turning of the crank 142 causes the bevel gear 144 meshing with the now stationary sun gear 146 to turn screw 100' carrying nut 101 toward one end of the crank, depending on the direction of the thread, until the brake band is released, thus adjusting the length of the stroke and in turn the cone angle of the burner nozzle. While the screw is in motion by the action of bevel gear 144, bevel gear 145 is also in motion, turning sun gear 147 idly in the opposite direction. If, on the other hand, the brake band 151 is tightened, the sun gear 147 becomes stationary causing a relative movement in the opposite direction.

Figures 13, 14, 15:
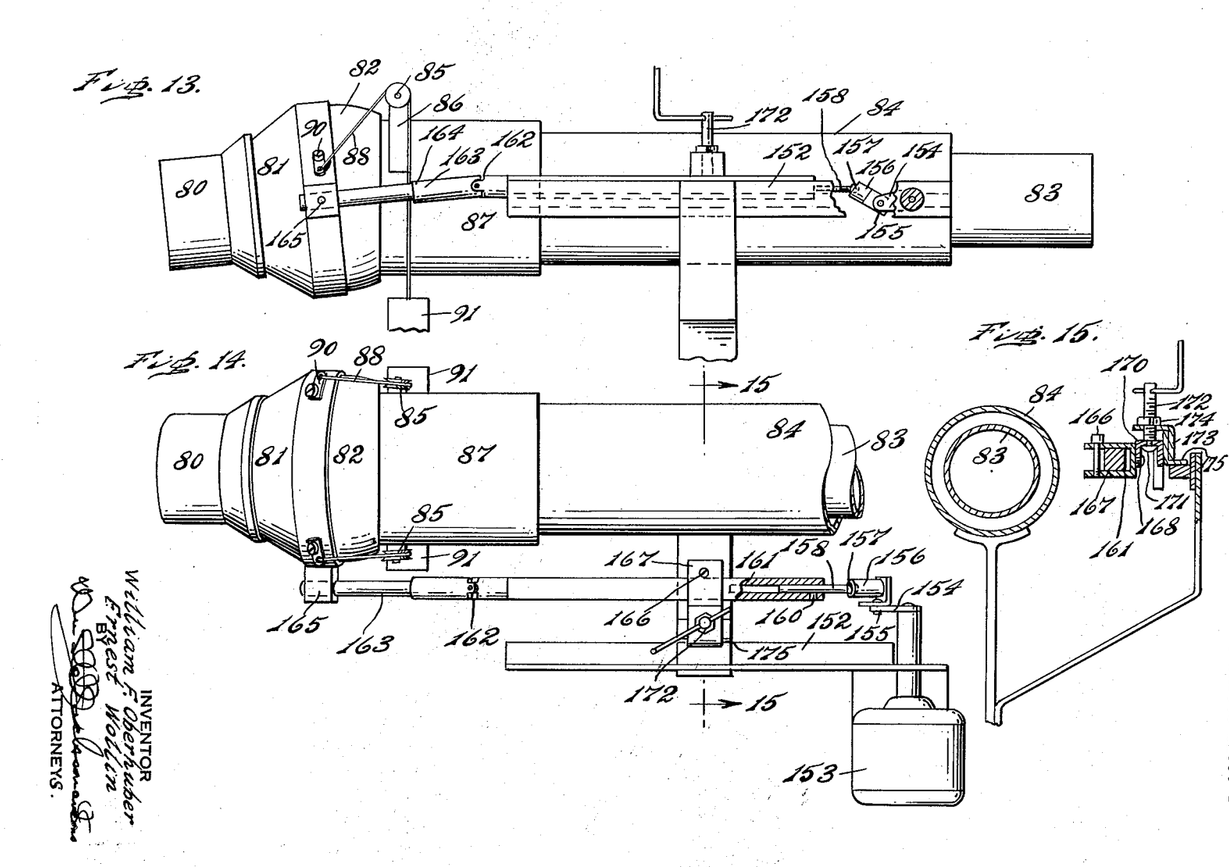
Figure 13 is a side elevation showing a further modification.
Figure 14 is a fragmentary top plan view of the form of Figure 13.
Figure 15 is a section along the line 15—15 of Figure 14.

Figures 13 to 15 show a further modification of the invention which is illustrative of the extreme simplicity which can be employed in some cases with some corresponding sacrifice in control of the orbit.

This form employs a single crank and a single push rod combination.

This structure has a bracket 152 which mounts a motor 153 driving a crank arm 154 pivotally connecting by crank pin 155 with link 156 which makes universal joint connection at 157 with a rod 158 adjustably secured by set screw 160 in a push rod 161 which interconnects by a universal joint 162 with a forward push rod extension 163. The forward push rod extension is fastened to a bracket 165 at one side of the forward end of the nozzle means.

The push rod 161 is guided by bolt 166 and yoke 167 which pivotally connects at 168, as best seen in Figure 15, with a horizontal guiding channel 170 making pivotal connection at 171 on the lower end of an adjustment screw 172 which is threaded through an angle 173. The adjustment position is controlled by a lock nut 174.

A longitudinally stationary angle 175 extends upward on the bracket and hooks between the downward portion of the angle 173 and one side of the guiding channel 170 so as to form a sliding guide for the push rod 161.

In operation of the device of Figures 13 to 15, the crank motion tends to move the burner nozzle up and down and also to produce a sidewise component. The up and down motion is permitted by the swinging of the pivot 168 and the universal joints 157 and 162 while the sidewise motion is permitted particularly by the universal joint 162.

It will be evident that if it is desired to obtain merely horizontal motion or merely vertical motion, this can be accomplished by adjusting the crank or other mechanism to a position in which the crank or other mechanism is not effective in one plane but is effective in a plane at right angles thereto.

If it is desired to obtain merely horizontal motion the yoke 167 is moved toward the nozzle to its limit of movement close to the universal joint 162. The vertical movement imparted to the universal joint 162 by the action of the crank 154 will then be practically negligible because of the long distance between the crank and the pivot 168 as compared with the very short distance between the universal joint 162 and the pivot 168. (It is readily understood that if these distances were equal the vertical movement of the push rod 161 at the joint 162 would be the same as that at the crank.)

In order to obtain merely vertical motion, the set screw 160 is loosened permitting the rod 158 to slide back and forth within the end of the push rod 161 without contributing any horizontal component of movement thereto. The magnitude of the vertical movement is controlled by suitably positioning the yoke 167 along the bracket 152.

In view of my invention and disclosure variations and modifications to meet individual whim or particular need will doubtless become evident to others skilled in the art, to obtain all or part of the benefits of my invention without copying the structure shown, and I therefore claim

Having thus described our invention, what we claim as new and desire to secure by Letters Patent is:

1. In a burner for fluid fuel, fuel and air nozzles interrelated and adapted to move together universally, a fuel channel extending to the fuel nozzle, an air housing extending to the air nozzle, said nozzles having a portion of generally hollow cylindrical shape with said fuel nozzle concentrically within said air nozzle, said nozzles having substantially coterminous outer ends and the inner ends of the air nozzle and the fuel nozzle terminating in a convex spherical surface and a concave spherical surface respectively, said fuel channel terminating in an annular convex spherical surface engaging the inner end of said fuel nozzle and said air housing having an annular portion concentrically surrounding said fuel channel and terminating in a concave spherical surface engaging the convex inner end of said air nozzle, said convex spherical surfaces and said concave spherical surfaces being concentric, the engagement of said surfaces forming seals maintaining separation of the fuel stream from the air stream and of the air stream from the surrounding atmosphere, and said fuel nozzle and said fuel channel having a medial position of engagement in which the longitudinal axis of said fuel nozzle and the longitudinal axis of said fuel channel are aligned.

2. In a burner for fluid fuel, a nozzle, a tube connecting to the nozzle, a universal joint between the tube and the nozzle, a pair of gimbal plates behind said nozzle pivotally mounted on axes transverse with respect to said tube and at right angles to each other, a pair of crank means operating in planes respectively transverse to and behind said gimbal plates, and connecting means connecting the respective crank means to the nozzle at positions displaced approximately 90° from one another, each of said connecting means being intermediately pivotally connected to a respective gimbal plate.

3. In a burner for fluid fuel, nozzle means, means for supplying combustion ingredients to the nozzle means, a universal joint connecting the nozzle means and the means for supplying the combustion ingredients, first crank means behind the nozzle means having its axis in one plane transverse to the longitudinal axis of the burner, second crank means behind the nozzle means having its axis transverse to the longitudinal axis of the burner and at right angles to the axis of the first crank means, a rotatable shaft cooperatively connected with the two crank means for rotating both cranks in unison, connecting means interconnecting the nozzle means with the respective crank means, and a pair of gimbal plates each pivotally mounted on an axis respectively parallel to the axis of one of said crank means between the respective crank means and said nozzle means and pivotally connected with said connecting means.

4. In a burner for fluid fuel, a nozzle, a tube connecting to the nozzle, a universal joint between the tube and the nozzle, a gimbal plate behind said nozzle, means for positioning said plate at various angles with respect to the axis of said tube, connecting means connecting said plate with said nozzle and means for changing the angle of said plate with respect to said axis, whereby the nozzle may be selectively positioned at various angles with respect to said tube.

5. A burner for fluid fuel of claim 1, including mechanism for automatically manipulating the tips of the nozzles throughout an orbital path about a center of symmetry, and means for adjusting the angle between the axis of the fuel channel and the line joining said center of symmetry and the center of said spherical surfaces.

6. In a burner for fluid fuel, fuel and air nozzles interrelated and adapted to move together universally, said fuel nozzle being concentrically within said air nozzle, a fuel channel extending to the fuel nozzle, an air housing extending to the air nozzle, concentric universal joints between the fuel and air nozzles and the fuel channel and air housing, and linkage means associated with said nozzles for supporting said nozzles and for universally associating the angular relation of the axis of said nozzles with respect to the axis of said fuel channel, said linkage means comprising a plurality of rods disposed generally longitudinally of said fuel channel and extending forwardly thereof, said rods adjacent said forward ends being pivotally attached to said nozzles, means to apply variable forces longitudinally of said rods, and means attached to and acting on the upper parts of said nozzles for urging said parts rearwardly and upwardly, whereby said linkage means will maintain in all of the possible positions of said angular relation a predetermined free spacing between the portions of said universal joints associated with said nozzles and the portions of said universal joints associated with the fuel channel and the air housing.

7. A burner of claim 6, in which said linkage means includes means for adjusting the space setting between said portions of said universal joints.

8. A burner of claim 6, in which said linkage means has two pairs of rods effective about two respective axes transverse to the axis of the nozzles for universally associating the angular relation of the axis of said nozzles with respect to the axis of said fuel channel.

9. A burner of claim 6, in which the means for urging said parts rearwardly and upwardly is a counterweight means.

10. In a burner for fluid fuel, fuel and air nozzles interrelated and adapted to move together universally, said nozzles being of generally hollow cylindrical shape with said fuel nozzle concentrically within said air nozzle, said nozzles having substantially coterminous outer ends, a fuel channel extending to the fuel nozzle, an air housing extending to the air nozzle, a first universal joint between the fuel nozzle and the fuel channel, a separate concentric second universal joint between the air nozzle and the air housing, mechanism for predetermined programmed manipulation of the tips of the nozzles throughout an orbital path about a center of symmetry, and means to adjust the angle between the axis of the fuel channel and a straight line passing through said center of symmetry and the common center of said universal joints, said fuel nozzle and said fuel channel having a medial position of engagement in which their respective axes are aligned.

11. In a burner, nozzle means, connecting means maintaining connection to the nozzle means, mechanism for moving the nozzle means over a sweeping universal path, said mechanism including two elements interconnected with said connecting means and pivotally movable on respectively perpendicular axes, and remote indicator means connected to each of said elements and indicating the instantaneous angular positions of the nozzle means with respect to the connecting means in respective planes normal to each of said axes.

References Cited in the file of this patent

UNITED STATES PATENTS

| | | |
|---|---|---|
| 789,796 | Cooke | May 16, 1905 |
| 1,096,458 | Redd et al. | May 12, 1914 |
| 2,130,329 | Sammons | Sept. 13, 1938 |
| 2,462,734 | Ferris | Feb. 22, 1949 |
| 2,654,331 | Mosshardt | Oct. 6, 1953 |

FOREIGN PATENTS

| | | |
|---|---|---|
| 198,648 | Germany | May 22, 1908 |
| 725,838 | France | Feb. 16, 1932 |